April 12, 1932.   A. W. HEINEMANN   1,853,612
AUTOMOBILE OILING INDICATOR
Filed June 18, 1931   2 Sheets-Sheet 1
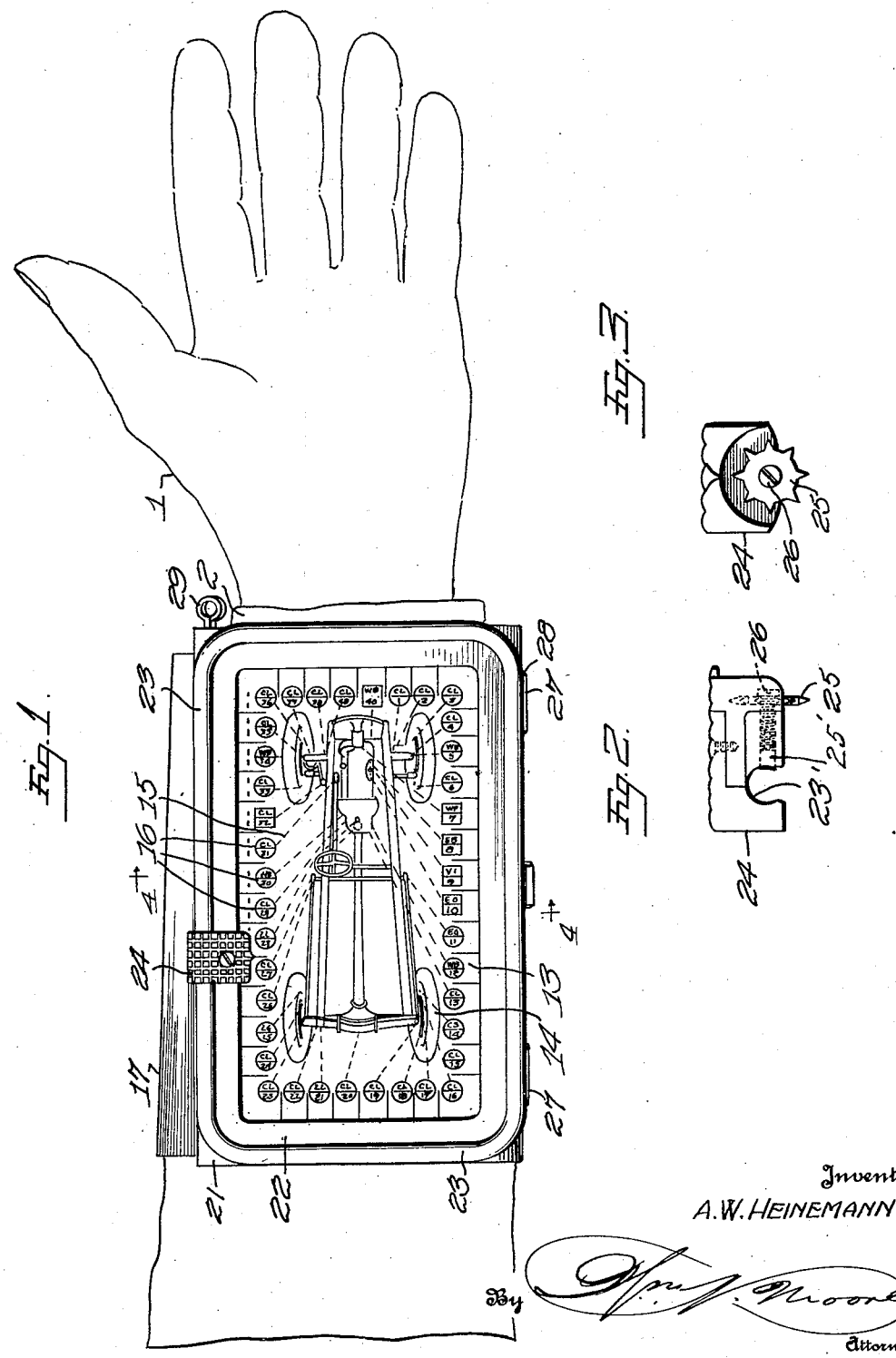

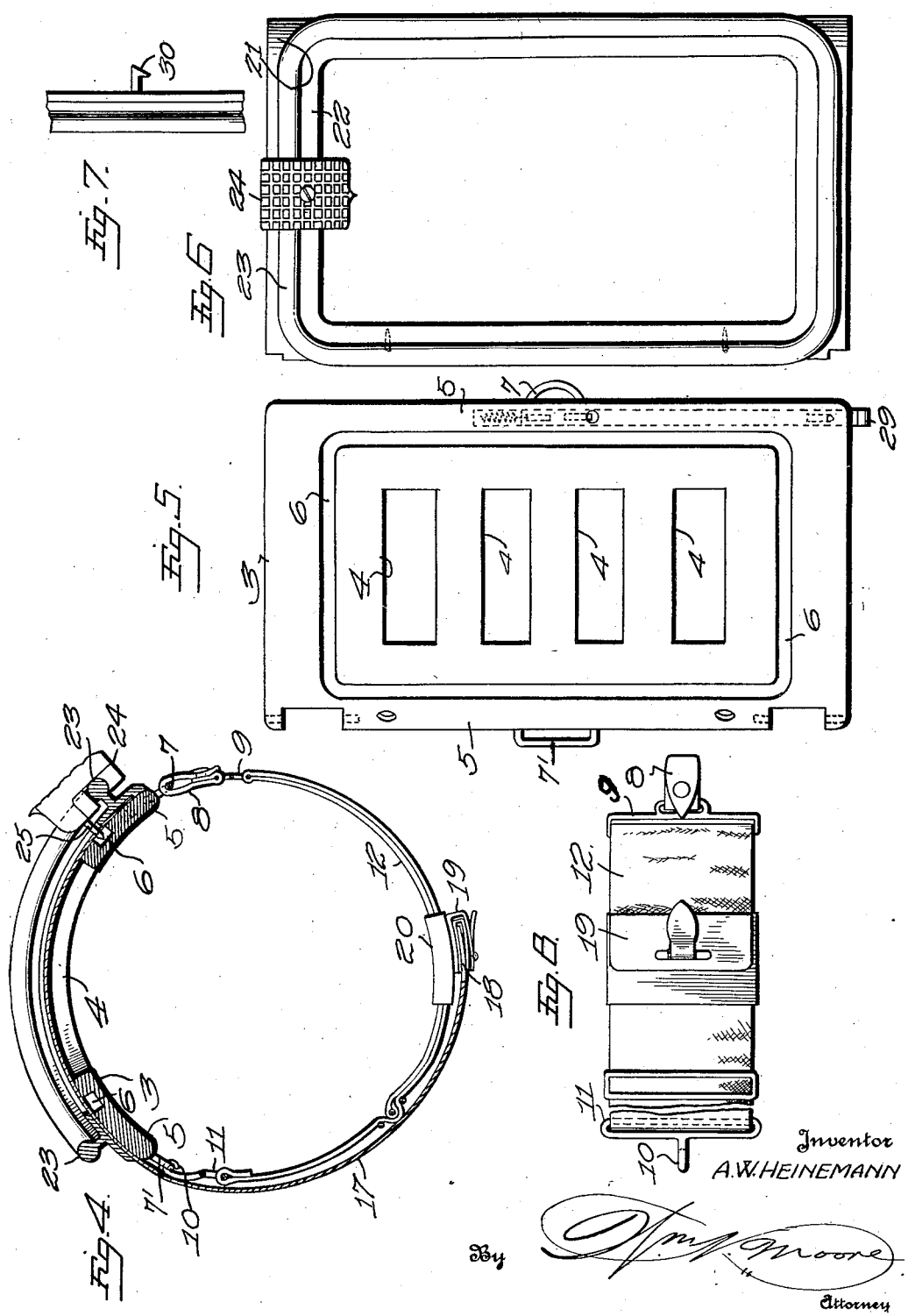

Patented Apr. 12, 1932

1,853,612

UNITED STATES PATENT OFFICE

ALBERT W. HEINEMANN, OF INDEPENDENCE, KANSAS

AUTOMOBILE OILING INDICATOR

Application filed June 18, 1931. Serial No. 545,353.

My invention relates to improvements in automobile oiling indicators for indicating or designating all the parts of the automobile which require oiling in order that a perfect job of lubricating each and every part requiring lubricant may be reached.

In the oiling or lubricating of all the parts of an automobile under present conditions, the service attendant must to a great extent rely on his memory as to just what parts of the mechanism he has oiled and this is entirely too much of a guess to enable the attendant to make a satisfactory result of his labor and this naturally is a serious defect and objection.

The main object of my invention is the production of a device which will indicate every part of the automobile which requires lubrication and to register on a suitable chart as the work of oiling progresses and thus insure that every piece of mechanism will be lubricated and a perfect and complete oiling of the entire machine will be accomplished.

Another object of my invention is the provision of a device for indicating the oiling of the parts of an automobile which can be carried upon the wrist of the attendant and which will have an indicating chart and means for operating in conjunction with said chart to disclose the oiling of the parts of the automobile.

Another object of my invention is the provision of an indicating device of the character and for the purposes stated which can be easily applied and removed from the wrist and which can be adjusted to fit the wrist and which will allow ready insertion and removal of the chart and which will display the chart in the most convenient and desirable position to be read.

Another object of my invention is provision of a device for indicating the oiling of the parts of an automobile which can be operated with facility by any person and which as the oiling of the parts progresses will leave an indication on the chart and thus make it impossible for the attendant to make an error or overlook any part of the automobile which requires lubricating.

Another object of my invention is the provision of a device for indicating the oiling of an automobile which will be light in weight to be worn with ease; which will be small and compact in size to be free from cumbersomeness; which will be strong and durable and which may be sold at a price to make its use practically a necessity.

With these objects in view my invention consists of an automobile oiling indicator embodying novel features of construction and combination of parts substantially as described and claimed, and as shown in the accompanying drawings, in which:

Figure 1 represents a plan view of the indicator shown in position upon the wrist to indicate the manner of applying and using my device.

Figure 2 represents a side view of the movable member which indicates on the chart of my device.

Figure 3 is a front or inner end view of said travelling member.

Figure 4 represents a sectional view taken on line 4—4 of Figure 1.

Figure 5 represents a top plan view of the base or chart supporting member of my invention.

Figure 6 represents a top plan view of the upper open hinged member of my device which acts to clamp the chart in place upon the base member.

Figure 7 represents a detail view of the catch for retaining the parts in proper relation, and Figure 8 represents a plan view of the adjustable retaining strap and the clasp for holding the loose or free end of the chart.

Referring by numerals to the drawings in which the same numbers of reference are used to denote the same or like parts in all the views:

The numeral 1 designates a human hand and 2 designates the wrist upon which my indicator is applied in order that the device may be placed in the most convenient place, and the indicator proper comprises the curved base or supporting member 3, formed with a series of openings 4, and having the thickened rim or surrounding edge 5, provided with a channel or groove 6, in which the punching means travel as will presently appear.

The base or supporting member fits upon the wrist and mounted in the rim at each side and projecting therefrom are the loops 7 and 7', the loop 7 receiving the strap 8 carried by slide 9, while the loop 7', receives the hook 10, carried by slide 11, and said slides form the end connections of the adjusting wrist band 12, having the slide for adjusting the length of the band according to the size of the wrist and the desire of the user.

From the construction it will be noted that the base member fits snugly and is retained in proper adjustment upon the wrist, and that said member also forms the support for the end 13, of the chart which carries the picture or representation 14, of an automobile, from the various parts of which lead the lines 15, to the indications 16, of the various parts which require lubrication, while the other flap 17, of the chart which carries the manual operating in connection with the picture 14, passes down over the attaching band with its end 18, is retained in place by the hinged clasp 19, on the sleeve 20, which fits on said attaching band, as most clearly seen in Figures 4 and 8.

From the foregoing description it will be noted that a chart is used having a pictorial representation on one flap and suitable directions or a manual on its other end and the picture is in clear view by reason of its manner of support on the base member and the fact that it is held flat by means of the upper open hinged member or frame 21, whose flat surrounding rim 22, rests on the chart and holds said chart smooth and flat and rising from said flat rim is the surrounding guide or flange which provides a track 23 for the kerf 23', of the head, block or indicator 24, to travel upon and said indicator thus moves around the entire open frame or chart holding member and is provided with a toothed wheel 25, mounted on an adjustable stud 26, and which in its travel passes above the indications on the chart and as each part of the mechanism is lubricated, said teeth of the wheel act to punch the desired indication on the chart to denote upon the chart exactly what parts have been lubricated, and as such punching leaves a positive mark the attendant cannot possibly fail, if the chart is followed and the indications made thereon, and make a mistake in oiling each and every part which requires lubrication. The head 24, is retained upon the track 23, by means of the spring dog 25', in Figure 2.

The parts are hinged together by the hinge 27 and pintle 28, at one edge, while spring keeper 29, and catch 30, are placed on the opposite side to retain the base and clamping open frame when closed and to allow quick and ready opening of the said open frame to apply a new chart.

From the foregoing description, taken in connection with the drawings, the operation and advantages of my invention will be readily understood and all persons skilled in the oiling of the parts of an automobile, or in fact any other machine with which the device may be used, will appreciate the value and necessity of my improvement and will at once realize that a device is provided at small cost which will save a great amount of time, labor, and worry; which will absolutely insure every part of the mechanism being reached and lubricated; and which possesses every feature or requirement to provide a most useful, desirable, efficient and practical improvement for the purpose desired.

I claim:

1. In an indicating device of the character and for the purpose described, the combination with a chart, of means for holding and displaying said chart, and means for registering the indications on said chart as the parts are lubricated, said means consisting of a suitable frame, a guide or track on said frame, and an indicator movable on said track.

2. In an indicating device of the character and for the purpose described, the combination of a chart having a pictorial indicating means on one flap and a manual or description on the other, of means for holding and displaying the pictorial indicating means, a guide carried by said chart holding means, an indicator movable upon said guide, and means for securing and displaying the flap carrying the description or manual.

3. In an indicating device of the character and for the purpose described, the combination of a chart having indicating representations on one flap and a manual or description on its other flap, and a registering means for acting on said indicating representations comprising a guide or track and an indicator movable on said track.

4. An indicating device of the character and for the purpose described, comprising a base or supporting member, an open frame mounted above said member, and a travelling indicator guided upon said open frame, said open frame having a surrounding guide or track upon which said travelling indicator moves.

5. An indicator of the character and for the purpose described, comprising a supporting member, means for attaching said member, a hinged open frame member, a guide surrounding said hinged member, an indicating and registering means travelling on said guide and a chart retained between said base and open hinged member.

6. An indicator of the character and for the purpose described, comprising a structure adapted to be applied to the arm, and a chart having upon one portion a pictorial representation and on the other a manual or description according with the representation and adapted to be held in proper position in the indicating structure, said chart holding means comprising a base portion upon which the chart rests, an open frame connected with said base portion and clamping said chart in place, and a movable indicator travelling around said open frame.

7. An indicator of the character and for the purpose described, comprising a structure adapted to be applied to the arm and consisting of a chart holding member and an arm attaching member, said chart holding means comprising a base portion upon which the chart rests, an open frame connected with said base portion and clamping said chart in place, and a movable indicator travelling around said open frame.

8. An indicator of the character and for the purpose described, composed of a chart holding member consisting of a base portion, a frame connected to said base portion, a track upon said frame, an indicator movable upon said track, an attaching member, and a chart having one portion held and exposed in said chart holding member and its other portion held and exposed by said attaching member.

9. An indicator of the character and for the purpose described, comprising a part adapted to fit upon the arm, an adjustable arm attaching part connected with said arm fitting part, a clamping part connected with said arm fitting part, a chart having one flap retained in said arm fitting and clamping part and its other part secured in proper relation by said attaching part, and an indicating means carried by the clamping part to indicate upon that portion of said chart retained by the clamping and arm attaching parts.

In testimony whereof I affix my signature.

ALBERT W. HEINEMANN.